April 14, 1959 — C. W. BRYANT — 2,881,784
AUXILIARY VALVE OPERATING MECHANISM
Filed Oct. 7, 1954
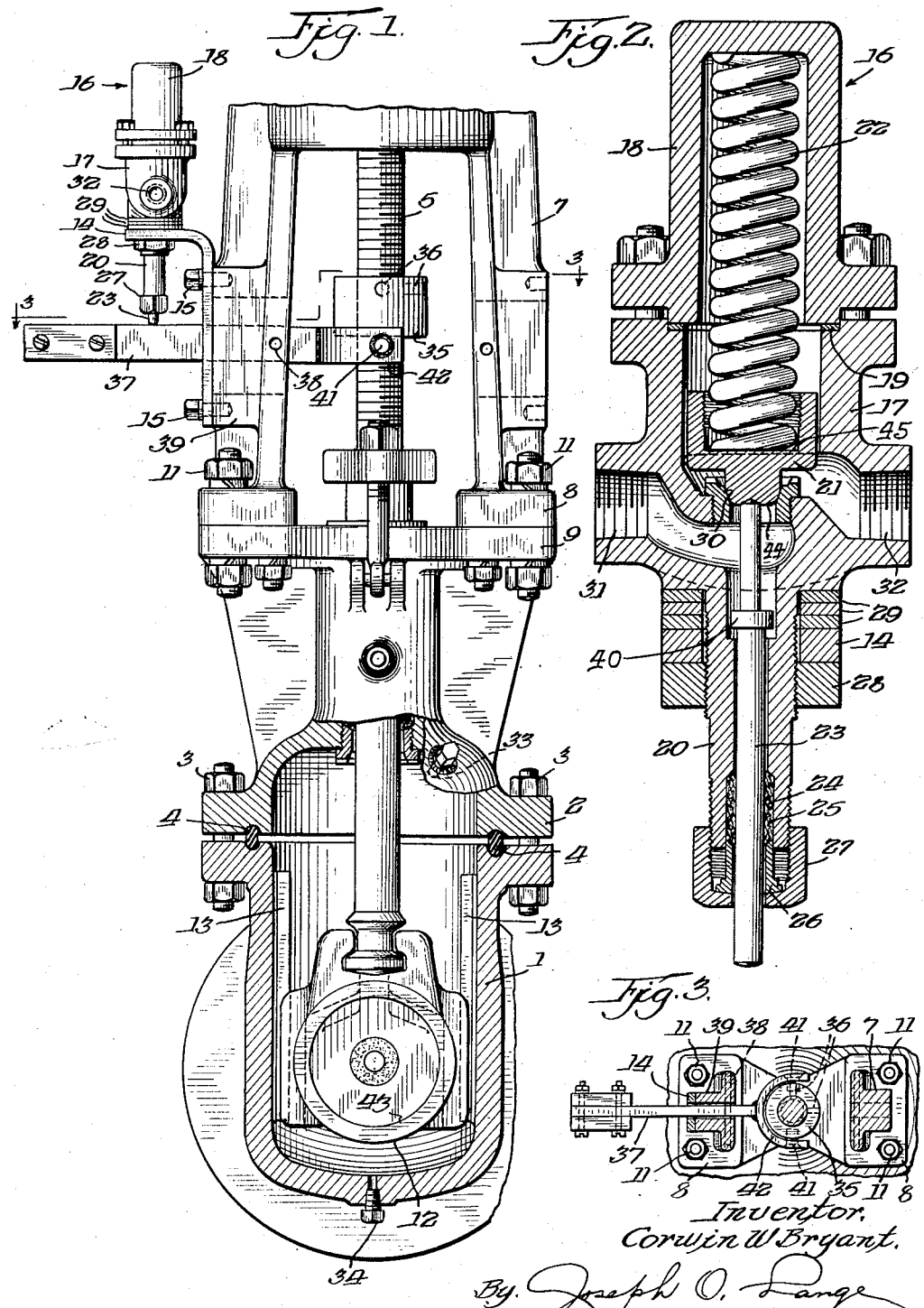

United States Patent Office 2,881,784
Patented Apr. 14, 1959

2,881,784

AUXILIARY VALVE OPERATING MECHANISM

Corwin W. Bryant, Downers Grove, Ill., assignor to Crane Co., Chicago, Ill., a corporation of Illinois Application October 7, 1954, Serial No. 460,997

4 Claims. (Cl. 137—246.13)

The present invention relates to a novel auxiliary valve operating mechanism and more particularly pertains to a device for positively sealing off two branches of a main pipeline, preventing admixture of the said branch contents despite the presence of a defective interconnecting valve.

In order to better appreciate the contribution made to the art by my invention, the following background should be borne in mind. In many industries, it is oftentimes of the utmost importance that the materials in different pipeline portions remain segregated in order to enable a processing step to be efficiently carried out. The safety of a process may also be dependent upon the complete and absolute segregation of different components present in one pipeline. In those instances, such as the above illustrations, a purging or sealing gas under pressure is introduced into the interconnecting valve cavity. In some cases, the bottom of the valve casing may have a removable plug or other opening, allowing the purging or sealing gas to flow continuously through the central cavity thereby exerting a siphoning effect upon any minute quantities of gases leaking in from either line and rapidly exhausting them into the atmosphere or into an appropriate collection chamber. As an alternative, the sealing gas may be directed into the valve cavity under pressure without providing a casing outlet, forcing the sealing gas under pressure to flow into either branch of the pipeline if a leak exists, thereby preventing the entrance into the valve cavity of any substance or substances or mixtures thereof present in either branch of the pipeline.

The usual method of introducing such sealing gas heretofore into the valve cavity has been by means of a spring-loaded globe valve which has been actuated by a complicated arrangement of gears, cams and switches which are in turn actuated by the various axial positions of the reciprocally movable stem member. It is, of course, obvious that the chances for malfunctioning of a given mechanism increases proportionately with the number of moving parts. It is the main object of my invention therefore to present an improved and simplified actuating system for purging or sealing the two branches of a pipeline. The actuating system of my invention comprises a minimum of parts and occupies a minimum amount of space. Despite the small number of parts, my novel system is capable of extremely fine adjustment as will hereinafter be explained in greater detail.

It is another object of my invention to present a simplified actuating mechanism for a purging valve which is composed of readily available parts which require no special handling or machining. The actuating valve is easily assembled relative to the main valve structure with a minimum of work being done on the main valve structure to effect the attachment of said actuating mechanism.

It is a further object of my invention to present an auxiliary valve actuating mechanism which does not require any modification of the power operating unit on the main line valve.

The above and other objects of my invention will become more manifest upon proceeding with the following detailed description read in the light of the accompanying drawings in which:

Fig. 1 is a fragmentary view partly in section of a gate valve utilizing my invention, showing the auxiliary valve in elevation.

Fig. 2 is a sectional assembly view of an auxiliary spring loaded globe valve.

Fig. 3 is a sectional view taken on line 3—3 of Fig. 1.

Similar reference numerals refer to similar parts throughout the several views.

Referring now to Fig. 1, a main valve such as a gate is fragmentarily shown. The valve comprises the usual valve casing 1 and the valve bonnet 2 maintained in the assembled position by means of the stud and nut assemblies 3 and maintained in a fluid-tight condition by means of the interposed gasket member 4. The stem member 5 is actuated by the usual motor, hydraulic or hand operable units (not shown). Any of the foregoing actuating units are supported by the yoke member 7 which is joined to the bonnet flange 9 by means of the nut and stud assembly 11 which cooperate with the yoke pads 8. The stem 5 has the closure member 12 affixed to its lower end limit. The latter member is reciprocally movable in the valve casing on the guide ribs 13. The mounting bracket 14 engages the yoke member 7 by means of the supporting cap screws 15.

The auxiliary globe valve 16 is preferably of the self-closing type and is securely mounted on the bracket member 14 and comprises (see Fig. 2), the cap portion 18 maintained in fluid sealing relationship with the body portion 17 by means of the interposed gasket member 19. The disc 21 has the spring member 22 abutting against its upper surface 45 and abuts the reciprocally movable stem member 23 on its lower surface 44. The stem member 23 passes through the stuffing box 24 in the course of effecting its reciprocal movement, the latter stuffing box containing the usual packing 25 held in place by the gland member 26 and the packing nut 27. Stem collar portion 40 defines the end limit of the stem downward axial movement through the stuffing box 24. The valve 16 has the locking nut member 28 threadedly engaged to the bonnet portion 20 for the purpose of securing the shim washers 29 of the auxiliary valve in tight abutting relation with the mounting bracket 14 more clearly seen in Fig. 1. The shim washers also assure exact positioning of the auxiliary valve relative to the remainder of the main valve assembly. The inlet 32 of the valve is connected to a source of sealing gas maintained under pressure; the valve outlet 31 is connected to the main valve bonnet 2 in the normal course of operation.

Referring once more to Fig. 1, it will be noted that the plugged inlet aperture 33 is positioned on the upper bonnet surface to permit entrance of a line leading from the auxiliary valve outlet 31. If a continuous flow of the sealing gas is desired the removable plug member 34 positioned on the bottom surface of the body 1 of the main valve may be removed or may be disengaged. Consequently, the sealing gas may flow in a continuous stream from the inlet 33 to the outlet opening 34.

Attention will now be given to the mechanism for actuating the auxiliary globe valve member 16. The latter mechanism comprises the trip nut 35 which is suitably tapped for threadedly engaging the stem member 5 and which is suitably apertured for insertion of the headless set screws 36 which lock the trip nut on the reciprocally movable stem member 5. The pivotally movable lever member 37 is traversed by the pin member 38, the latter pin member being journalled in the bifuracted yoke portion 39 (see Fig. 3). The contact prongs 41 set in the fork portion 42 of the lever 37 contact the trip nut member 35 as the reciprocally movable stem member 5 approaches the end limit of its downward axial movement. It should be understood that the initial contact between the prongs 41 and the trip nut 35 is effected just prior to the final fluid sealing or closing movement of the closure member 12. It will be noted that in the instant of this contact, the lever member 37 arcuately moves about pin 38 contacting and depressing the spring loaded stem member 23 of the auxiliary globe valve 16. As will be noted from Fig. 2, upon the occurrence of an upward axial movement of the stem 23, the disc 21 is removed from its seating surface 30 allowing the sealing gas to flow continuously from the inlet 32 through the outlet 31 into the bonnet opening 33 past the opposed seats 43 of the main valve member thence out the bottom body opening 34.

It is evident that the effective stem travel may be magnified or reduced by means of the lever member 37, according to the relative length and relative mechanical advantage of the two arms of the lever extending from the pin 38. Consequently, a small downward movement of the stem 23 may fully open the auxiliary valve 16 as a result of a greater lever arm length extending to and contacting the spring loaded stem member 23. Conversely, a gradual opening of the auxiliary valve 16 may be effected by allowing the greater lever arm to extend to the actuating trip nut 35.

It should be readily apparent from the illustrated apparatus in Fig. 1 that the trip nut member 35 may be readily positioned anywhere along the longitudinal axis of the reciprocally movable stem member 5. Thus, I have devised a method and apparatus for assuring a positive flow of a sealing gas through a main valve chamber past the main valve seats when the latter valve is in the closed position by the simple expedient of a lever member cooperating with an actuating trip nut member, the latter lever member concomitantly cooperating with an auxiliary spring loaded valve. The latter valve is joined to a source of sealing gas maintained under a positive pressure.

It is further apparent that the illustrated apparatus is readily adaptable to changes and modifications easily perceivable to those skilled in the art. For instance, the spring loaded globe valve at Fig. 2 may be readily substituted by a check valve or other equivalent means in the illustrated combination of Fig. 1 and the combination will still work to equal advantage. The outlet 34 of the body portion 1 of the main valve may be eliminated if the mere presence of an inert gas is desired between the opposed seats 43. If no casing opening, such as 34, is provided, any leaks on the seating surface or seating connection will result in an inward flow of the inert gas into the two valve passages of the main valve; however, if an opening, such as 34, is provided, a continuous flow of the sealing gas will be effected and any leakage from the opposed piping branches will be readily siphoned and eliminated along with the flow of the inert sealing gas.

It is thus apparent that I have provided a method and apparatus for assuring absolute segregation of two pipeline sections joined by a valve when said valve is in the normally seated position.

The ease of modification of the illustrated apparatus having been made apparent, I wish to be limited only by the scope of the appended claims.

I claim:

1. The combination comprising a main valve having spaced valve seats and a flow passage extending through the valve and the seats thereof, said main valve having a gate valve movable between said valve seats to close off said flow passage at one end limit of movement of the gate valve and a valve stem cooperable with said gate valve for effecting reciprocal movement of the latter, a lever rotatable about an axis which is fixed relative to the main valve, an auxiliary valve fixedly supported relative to said main valve, said auxiliary valve having a closure member and reciprocable actuating means for the latter, reciprocally movable trip means on said valve stem which moves in one direction when said gate valve moves from the open to closed positions and in the opposite direction when the gate valve moves from the closed to open positions, said trip means being effective to engage and swing said lever and move said actuating means and closure member actuated thereby of said auxiliary valve through contact of the lever with said actuating means as said gate valve is approaching its closed position, said closure member of the auxiliary valve being moved from the closed to an open position during at least the last part of the above swinging movement of the lever, fluid conduit means communicating between the auxiliary valve and interior chamber of the main valve extending between said spaced seats of the valve and within which said gate valve is housed, said closure member of the auxiliary valve opening up fluid communication between said auxiliary and main valves when actuated from the closed position by said actuating means, lever and means on said valve stem actuating in concert, said trip means being adjustable on said valve stem so as to initiate the opening movement of the auxiliary valve after the gate valve has first closed off the flow passage and before the end of its closing movement.

2. The subject matter of claim 1 including in combination therewith means providing for a continuous source of fluid under pressure exceeding the pressure of the fluid within either branch of said flow passage of the main valve when said gate valve thereof is in closed position and the flow passage is closed off, said means providing a continuous source of fluid being in fluid communication with the auxiliary valve and the fluid thereof flowable into the interior chamber of the main valve through said fluid conduit means between the auxiliary and main valves upon the closure member of the auxiliary valve being opened whereby to cause continuous fluid flow into the upstream and the downstream branches of the flow passage of the main valve in opposition to the upstream and downstream pressures therein when the gate valve is in fully closed position should there be any fluid leakage between the interior chamber and upstream portion of the flow passage and between the interior chamber and downstream portion of the flow passage, respectively.

3. The combination comprising a main valve having spaced valve seats and a flow passage extending through the valve and the seats thereof, said main valve having a gate valve movable between said valve seats to close off said flow passage at one end limit of movement of the gate valve and a rising valve stem cooperable with said gate valve for effecting reciprocal movement of the latter, a lever rotatable about an axis which is fixed relative to the main valve, an auxiliary valve fixedly supported relative to said main valve, said auxiliary valve having a closure member and reciprocable actuating means for the latter, means on said valve stem of the main valve effective to engage and swing said lever and move said actuating means and closure member actuated thereby of said auxiliary valve through contact of the lever with said actuating means as said gate valve is approaching its closed position, said closure member of the auxiliary valve being moved from the closed to an open position during at least the last part of the above swinging movement of the lever, fluid conduit means communicating between the auxiliary valve and interior chamber of the main valve extending between said spaced seats of the valve and within which said gate valve is housed, said closure member of the auxiliary valve opening up fluid communication between said auxiliary and main valves when actuated from the closed position by said actuating means, lever and means on said valve stem acting in concert, said means on said valve stem comprising trip means reciprocally movable on said valve stem and means cooperable with at least said trip means for preventing substantial movement of the trip means relative to said valve stem in either of the opposite directions of the reciprocal movement during normal operation of the main valve, said means cooperable with said trip means being movable at least by the use of a tool or tools to allow movement of said reciprocally movable member in either or both of the opposite directions of the reciprocal movement and relative to said valve stem for adjustment purposes.

4. The combination comprising a main valve having spaced valve seats and a flow passage extending through the valve and the seats thereof, said main valve having a gate valve movable between said valve seats to close off said flow passage at one end limit of movement of the gate valve and a valve stem cooperable with said gate valve for effecting reciprocal movement of the latter, said main valve including spaced yoke arm portions adjacent said valve stem, a substantially straight lever rotatably mounted intermediate its ends to and between said spaced yoke arms, an auxiliary valve fixedly supported relative to said main valve, said auxiliary valve having a closure member and reciprocable actuating means for the latter, trip means on said valve stem which moves in one direction when said gate valve moves from the open to closed positions and in the opposite direction when the gate valve moves from the closed to open positions, said trip means being effective to engage and swing said lever and move said actuating means and closure member actuated thereby of said auxiliary valve through contact of the lever with said actuating means as said gate valve is approaching its closed position in the final closing increment of closing travel, said closure member of the auxiliary valve being moved from the closed to an open position during at least the last part of the above swinging movement of the lever, said trip means engaging said lever adjacent one end thereof and said lever engaging the actuating means of the auxiliary valve on the opposite side of the fulcrum from the engagement of the trip member with said lever, fluid conduit means communicating between the auxiliary valve and interior chamber of the main valve extending between said spaced seats of the valve and within which said gate valve is housed, said closure member of the auxiliary valve opening up fluid communication between said auxiliary and main valves when actuated from the closed position by said actuating means, lever and means on said valve stem acting in concert, said trip member being reciprocally movable on said valve stem, said combination including means for preventing substantial movement of the trip member on said valve stem in either of the opposite directions of the reciprocal movement during normal operation of the main valve, said means for preventing movement of the trip member on said valve stem being movable at least by the use of a tool or tools to allow movement of said trip member on said valve stem in either of the opposite directions of the reciprocally movable trip member, when said gate valve and valve stem therefore are not being actuated for movement of the gate valve, for adjustment of the auxiliary valve closure member opening to the desired increment of final closing of said gate valve of the main valve.

References Cited in the file of this patent

UNITED STATES PATENTS

| | | |
|---|---|---|
| 1,133,644 | Hill | Mar. 30, 1915 |
| 1,691,626 | Cook | Nov. 13, 1928 |
| 1,839,092 | Feldmeier | Dec. 29, 1931 |
| 2,086,725 | McCausland | July 13, 1937 |
| 2,098,129 | Bell | Nov. 2, 1937 |
| 2,214,324 | Goldberg | Sept. 10, 1940 |
| 2,478,496 | Maynard | Aug. 9, 1949 |
| 2,495,081 | Thomas | Jan. 17, 1950 |

FOREIGN PATENTS

| | | |
|---|---|---|
| 569,893 | Germany | of 1933 |